United States Patent
Ogonowski et al.

(10) Patent No.: US 11,560,446 B2
(45) Date of Patent: Jan. 24, 2023

(54) POLYURETHANE FOAM ARTICLE AND METHOD OF FORMING SAME

(71) Applicant: BASF SE, Ludwigshafen am Rhein (DE)

(72) Inventors: Joseph Ogonowski, Wyandotte, MI (US); Chulhoon Jang, Hwaseong-si (KR); Achara Bowornprasirtkul, Samutprakarn (TH)

(73) Assignee: BASF SE, Ludwigshafen am Rhein (DE)

( * ) Notice: Subject to any disclaimer, the term of this patent is extended or adjusted under 35 U.S.C. 154(b) by 604 days.

(21) Appl. No.: 16/473,340

(22) PCT Filed: Dec. 27, 2017

(86) PCT No.: PCT/US2017/068512
§ 371 (c)(1),
(2) Date: Jun. 25, 2019

(87) PCT Pub. No.: WO2018/125907
PCT Pub. Date: Jul. 5, 2018

(65) Prior Publication Data
US 2020/0123302 A1    Apr. 23, 2020

Related U.S. Application Data

(60) Provisional application No. 62/439,186, filed on Dec. 27, 2016.

(51) Int. Cl.
| | | |
|---|---|---|
| *C08G 18/48* | (2006.01) | |
| *C08G 18/10* | (2006.01) | |
| *C08G 18/08* | (2006.01) | |
| *C08G 18/76* | (2006.01) | |
| *C08J 9/00* | (2006.01) | |
| *C08J 9/12* | (2006.01) | |
| *C08J 9/14* | (2006.01) | |
| *C08J 9/20* | (2006.01) | |

(52) U.S. Cl.
CPC .......... *C08G 18/4829* (2013.01); *C08G 18/10* (2013.01); *C08G 18/14* (2013.01); *C08G 18/7671* (2013.01); *C08J 9/0028* (2013.01); *C08J 9/0095* (2013.01); *C08J 9/125* (2013.01); *C08J 9/142* (2013.01); *C08J 9/20* (2013.01); *C08G 2110/005* (2021.01); *C08G 2110/0058* (2021.01); *C08J 2203/10* (2013.01); *C08J 2203/12* (2013.01); *C08J 2203/184* (2013.01); *C08J 2375/08* (2013.01)

(58) Field of Classification Search
CPC .... C08G 18/10; C08G 18/14; C08G 18/3206; C08G 18/3284; C08G 18/482; C08G 18/4829; C08G 18/4845; C08G 18/6688; C08G 18/7671; C08G 2110/0025; C08G 2110/005; C08G 2110/0058; C08J 9/0028; C08J 9/0095; C08J 9/125; C08J 9/142; C08J 9/20; C08J 2203/10; C08J 2203/12; C08J 2203/184; C08J 2375/08
See application file for complete search history.

(56) References Cited

U.S. PATENT DOCUMENTS

| | | | |
|---|---|---|---|
| 5,525,641 A | 6/1996 | White, III et al. | |
| 6,423,755 B1 | 7/2002 | Allen et al. | |
| 2012/0216952 A1* | 8/2012 | Bushendorf | ....... C08G 18/7664 156/331.4 |
| 2014/0308492 A1 | 10/2014 | Albach et al. | |

FOREIGN PATENT DOCUMENTS

| | | | |
|---|---|---|---|
| CA | 1227203 A1 * | 9/1987 | |
| CA | 1227209 A | 9/1987 | |
| EP | 0118725 A2 | 9/1984 | |
| JP | 6-239956 A | 8/1994 | |
| JP | 2003-524051 A | 8/2003 | |
| JP | 2005-344079 A | 12/2005 | |
| JP | 2014-185345 A | 10/2014 | |
| JP | 2014-530282 A | 11/2014 | |
| JP | 2015-524486 A | 8/2015 | |
| JP | 2016-74885 A | 5/2016 | |
| WO | 01/62842 A1 | 8/2001 | |
| WO | 2008/014227 A2 | 1/2008 | |
| WO | 2013/053555 A2 | 4/2013 | |

OTHER PUBLICATIONS

International Preliminary Report on Patentability from counterpart International Application No. PCT/US2017/068512 dated Jul. 2, 2019.
Preliminary Official Action from corresponding Brazilian Patent Appln, No. BR112019013260-0 dated Aug. 31, 2021.
Substantive Examination Report from counterpart Indonesian Patent Appln. No. PID201905950 dated Mar. 5, 2021, and its English translation.
International Search Report and Written Opinion from counterpart International Application No. PCT/US2017/068512 dated Apr. 6, 2018.
Notice of Reasons for Refusal from corresponding Japanese Patent Application No. 2019-535256 dated Nov. 24, 2021, and its English translation.

* cited by examiner

*Primary Examiner* — John M Cooney
(74) *Attorney, Agent, or Firm* — DLA Piper LLP (US)

(57) ABSTRACT

A polyurethane foam article comprises the reaction product of an isocyanate component and isocyanate-reactive composition in the presence of a blowing agent. The isocyanate component includes an isocyanate prepolymer comprising the reaction product of a first polyether polyol and a methylene diphenyl diisocyanate. The isocyanate-reactive composition comprises a second polyether polyol having secondary terminal hydroxyl groups and an amine-initiated catalytic polyether polyol having primary hydroxyl groups. A method of making the polyurethane foam article comprises the steps of reacting the first polyether polyol and methylene diphenyl diisocyanate to form the isocyanate prepolymer and reacting the isocyanate prepolymer with the isocyanate-reactive composition in the presence of the blowing agent to form the polyurethane foam article.

18 Claims, No Drawings

POLYURETHANE FOAM ARTICLE AND METHOD OF FORMING SAME

BACKGROUND OF THE INVENTION

1. Field of the Invention

The subject invention generally relates to a polyurethane foam article and a method of forming the polyurethane foam article. More specifically, the subject invention relates to a method of forming a polyurethane foam article comprising the reaction product of an isocyanate-reactive composition and an isocyanate component, in the presence of a blowing agent.

2. Description of the Related Art

Use of polyurethane foam articles throughout transportation, building, sporting, and other industries is known in the art. In the sporting industry, polyurethane foam articles are used to make surfboards. As surfboards, polyurethane foam articles provide excellent buoyancy in combination with excellent strength and durability.

As is known in the art, polyurethane foam articles are formed via the exothermic reaction of an isocyanate-reactive resin composition and an isocyanate in the presence of a blowing agent. The isocyanate-reactive resin composition, the isocyanate, and the blowing agent, collectively known as a polyurethane system, are selected to optimize manufacturing efficiency and performance properties of the polyurethane foam article for a particular use. For example, when using the polyurethane foam for a surfboard, the components of the polyurethane system are selected for molding efficiency and to produce a polyurethane foam article (e.g. a surfboard blank) having exceptional buoyancy, strength, durability, color, color stability, and other performance properties.

In surfboard applications, the isocyanate-reactive resin composition and the isocyanate are typically mixed in the presence of the blowing agent to form a reaction mixture, which is injected into a mold and reacts to form the surfboard blank. In past surfboard applications, toluene diisocyanate has been used to form buoyant surfboard blanks having excellent strength and color (i.e. white color). However, safety and environmental concerns have started to preclude surfboard manufacturers from the use of toluene diisocyanate.

Recently, surfboard manufacturers have attempted to use monomeric and polymeric diphenylmethane diisocyanate, hexamethylene diisocyanate, isophorone diisocyanate, and other isocyanates for the production of surfboard blanks. Many of these attempts have failed. For example, use of monomeric and polymeric diphenylmethane diisocyanate often causes surfboard blanks to discolor, split, scorch, burn, adhere to the mold, and other problems associated with an uncontrolled exotherm which is generated during the formation of the surfboard blanks. Further, once formed, surfboard blanks formed with monomeric and polymeric diphenylmethane diisocyanate can exhibit poor strength and color stability.

To this end, various polyurethane systems which do not utilize toluene diisocyanate have been developed in an attempt to produce surfboard blanks. Despite such development, there remains a need to further improve polyurethane systems and the surfboard blanks formed therefrom.

SUMMARY OF THE INVENTION AND ADVANTAGES

The subject invention provides a polyurethane foam article comprising the reaction product of an isocyanate component and an isocyanate-reactive composition in the presence of a blowing agent. The isocyanate component includes an isocyanate prepolymer comprising the reaction product of a first polyether polyol and a methylene diphenyl diisocyanate. The isocyanate-reactive composition comprises a second polyether polyol having secondary terminal hydroxyl groups and an amine-initiated catalytic polyether polyol having primary hydroxyl groups.

The subject invention also provides a method of making the polyurethane foam article comprising the steps of reacting the first polyether polyol and methylene diphenyl diisocyanate to form the isocyanate prepolymer and reacting the isocyanate prepolymer with the isocyanate-reactive composition in the presence of the blowing agent to form the polyurethane foam article.

Advantageously, the polyurethane foam article can be made safely and efficiently to produce a polyurethane foam article (e.g. a surfboard blank) having exceptional buoyancy, strength, durability, color, color stability, and other performance properties.

DETAILED DESCRIPTION OF THE INVENTION

A polyurethane foam article is disclosed. The polyurethane foam article results from an exothermic reaction of a polyurethane system comprising an isocyanate-reactive resin composition and an isocyanate component in the presence of a blowing agent. The polyurethane foam article of the present invention is typically used as a surfboard blank. However, it is to be appreciated that the rigid polyurethane foam of the subject disclosure may be used for many other applications as well.

The subject invention provides a polyurethane foam article comprising the reaction product of an isocyanate component and isocyanate-reactive composition in the presence of a blowing agent. The isocyanate component includes an isocyanate prepolymer comprising the reaction product of a first polyether polyol and a methylene diphenyl diisocyanate. The isocyanate-reactive composition comprises a second polyether polyol having secondary terminal hydroxyl groups and an amine-initiated catalytic polyether polyol having primary hydroxyl groups. The unreacted isocyanate-reactive resin composition, the isocyanate component, and the blowing agent are collectively referred to as a polyurethane system.

The polyurethane foam article includes the reaction product of the isocyanate component and the isocyanate-reactive composition in the presence of the blowing agent, i.e., the isocyanate prepolymer and the polyols of the isocyanate-reactive component chemically react in the presence of the blowing agent. The instant disclosure also describes a polyurethane system comprising the isocyanate component and the isocyanate-reactive component. The system is typically provided in two or more discrete components, such as the isocyanate component and the isocyanate-reactive (or resin) composition, i.e., as a two-component (or 2K) system, which is described further below. It is to be appreciated that reference to the isocyanate component and isocyanate-reactive composition, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other and mixed individually prior to application. As another example, a component typically included (and described herein as such) in the isocyanate-reactive composition may be mixed and used with the isocyanate component.

The polyurethane foam article of the instant disclosure typically has a closed cell content of greater than about 85, alternatively from about 85 to about 95, % when tested in accordance with ASTM D2856-94.

The polyurethane foam article of the instant disclosure typically has a density of from about 16 to about 240, from about 24 to about 80, from about 28 to about 60, from about 40 to about 60, from about 47 to about 52, kg/m$^3$ when tested in accordance with ASTM D1622-14.

The polyurethane foam article of the subject invention can be described as a "rigid polyurethane foam." The terminology "rigid polyurethane foam" describes a particular class of polyurethane foam and stands in contrast to flexible polyurethane foam. Rigid polyurethane foam is generally non-porous, having closed cells and minimal elastic characteristics, whereas flexible polyurethane foam is generally porous and has open cells.

The Isocyanate Component

The polyurethane system of the present disclosure includes the isocyanate component. The isocyanate component includes the isocyanate prepolymer. The isocyanate prepolymer comprises the reaction product of the first polyether polyol and the methylene diphenyl diisocyanate. In some embodiments, the isocyanate prepolymer consists essentially of the reaction product of the first polyether polyol and the methylene diphenyl diisocyanate in the presence of various additives. In some embodiments, the isocyanate prepolymer consists of the reaction product of the first polyether polyol and the methylene diphenyl diisocyanate.

Polyether polyols as described herein and suitable for purposes of the present invention include, but are not limited to, products obtained by the polymerization of a cyclic oxide (i.e. an alkylene oxide), for example, ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

To this end, polyether polyols as described herein include a plurality of alkyleneoxy groups. The term alkyleneoxy group describes a mer, or unit. The alkyleneoxy group is the unit which results from the polymerization of the alkylene oxide, e.g. EO groups, PO groups, and BO groups. If referenced, the amount of alkyleneoxy groups in the polyether polyols is referenced in parts by weight, based on the total weight of the alkyleneoxy groups used to form the polyether polyol. The plurality of alkyleneoxy groups may be arranged to form polyether polyols which are described as polyols having random alkyleneoxy groups (which make up heteric segments), polymers having repeating alkyleneoxy groups, and polymers having blocked alkyleneoxy groups. The plurality of polymeric side chains has alkoxyl end caps selected from the group of ethyleneoxy end caps, propyleneoxy end caps, butyleneoxy end caps, and combinations thereof. The amount of alkyleneoxy end caps in the polyether polyols is referenced in percent (%), based on the total number of end caps in a sample of the particular polyether polyol.

Referring now to the first polyether polyol, the first polyether polyol typically has a functionality of greater than about 2, alternatively greater than about 3, alternatively from about 2 to about 5, alternatively from about 3 to about 5, alternatively about 4; a weight average molecular weight of from about 200 to about 900, alternatively from about 300 to about 700, alternatively from about 300 to about 500, alternatively from about 350 to about 450, g/mol; a hydroxyl value of from about 30 to about 1,100, alternatively from about 400 to about 900, alternatively from about 435 to about 570, alternatively from about 435 to about 465, alternatively from about 540 to about 570, mg KOH/g; and a viscosity at 20° C. of from about 1,000 to about 8,000, alternatively from about 4,000 to about 6,000, alternatively from about 4,800 to about 5,600, cps when tested in accordance with ASTM D2196-15. In various non-limiting embodiments, all values and ranges of values between the aforementioned values are hereby expressly contemplated.

In some embodiments, the first polyether polyol is initiated with pentaerythritol. An initiator, also referred to as a starter, functions as a reaction base for compounds, such as alkylene oxides, which are polymerized to form polyols, and also serves to anchor polyols during formation. The first polyether polyol of these embodiments can comprise EO, PO, and/or BO groups and has various percentages of PO capping. The first polyether polyol has greater than about 90, alternatively greater than about 95, alternatively greater than about 99, alternatively about 100, % PO capping. More specifically, by "about" 100% PO capping, it is meant that all intended capping of the first polyether polyol is PO capping, with any non-EO capping resulting from trace amounts of other alkylene oxides or other impurities. As such, the capping is typically about 100% PO capping, but may be slightly lower, such as at least about 99% PO capping, depending on process variables and the presence of impurities during the production of the first polyether polyol.

In one embodiment, the first polyether polyol is a pentaerythritol initiated polyether polyol with PO capping which has: a functionality of about 4; a weight average molecular weight of about 400 g/mol, and a hydroxyl number of about 555 mg KOH/g.

Referring now to the methylene diphenyl diisocyanate, the methylene diphenyl diisocyanate is a liquid having an NCO content (weight %) of about 33.5. Determination of NCO contents (% NCO) is accomplished by a standard chemical titration analysis known to those skilled in the art. The methylene diphenyl diisocyanate includes isomers selected from the group of 2,2'-isomer, 2,4'-isomer, and 4,4'-isomer.

In some embodiments, the methylene diphenyl diisocyanate comprises: less than 12, alternatively less than 10, alternatively less than 5, alternatively less than 1, alternatively about 0, alternatively from about 2 to about 12% by weight of the 2,2'-isomer; greater than 40, alternatively from about 0 to 90, alternatively from about 20 to 60, alternatively about 40 to 55, alternatively about 50% by weight 2,4'-isomer; and greater than 40, alternatively from about 0 to 90, alternatively from about 20 to 60, alternatively about 40 to 55, alternatively about 50% by weight 4,4'-isomer, with % by weight based on the total weight of the methylene diphenyl diisocyanate. In various non-limiting embodiments, all values and ranges of values between the aforementioned values are hereby expressly contemplated.

In one embodiment, the methylene diphenyl diisocyanate comprises: less than 10% by weight of the 2,2'-isomer; from about 40 to about 60% by weight of the 2,4'-isomer; and from about 40 to about 60% by weight of the 4,4'-isomer, with % by weight based on the total weight of the methylene diphenyl diisocyanate. In various non-limiting embodiments, all values and ranges of values between the aforementioned values are hereby expressly contemplated.

In another embodiment, the methylene diphenyl diisocyanate comprises: trace amounts (e.g. less than 1, less than 0.5, % by weight) of the 2,2'-isomer; about 50% by weight (e.g. 50±0.5, 1, 2, 3, 4, 5, 6, 7, 8, 9, 10, % by weight) of the 2,4'-isomer; and about 50% by weight (e.g. 50±0.5, 1, 2, 3, 4, 5, 6, 7, 8, 9, 10, % by weight) of the 4,4'-isomer.

In yet another embodiment, the methylene diphenyl diisocyanate includes about 50% by weight 2,4'-isomer based on the total weight of the methylene diphenyl diisocyanate with the other about 50% comprising any combination of 2,2'-isomer and 4,4'-isomer.

As is set forth above, the isocyanate prepolymer comprises the reaction product of the first polyether polyol and the methylene diphenyl diisocyanate. In various embodiments, the first polyether polyol is present in the isocyanate prepolymer in an amount of from about 2 to about 20, alternatively from about 5 to about 15, alternatively from about 7 to about 10, % by weight based on the total weight of said isocyanate prepolymer, and said methylene diphenyl diisocyanate is present in said isocyanate prepolymer in an amount of from about 80 to about 98, alternatively from about 85 to about 95, alternatively from about 90 to about 93, % by weight based on the total weight of said isocyanate prepolymer. Of course, the isocyanate prepolymer comprises the reaction product of the first polyether polyol and the methylene diphenyl diisocyanate, and the ranges above are essentially, or can be considered in the alternative, the amounts of the first polyether polyol and methylene diphenyl diisocyanate reacted and to form the isocyanate prepolymer. In various non-limiting embodiments, all values and ranges of values between the aforementioned values are hereby expressly contemplated.

Further, embodiments wherein the isocyanate prepolymer comprises the reaction product of more than one isocyanate (e.g. different isocyanates in addition to the methylene diphenyl diisocyanate) and/or more than one polyol (e.g. different polyols in addition to the first polyether polyol) are contemplated herein. In such embodiments, the total amount of all polyols included is within the above ranges.

The chemical reaction of the first polyether polyol and the methylene diphenyl diisocyanate to form the isocyanate prepolymer can be conducted in the presence of one or more additives. Suitable additives for purposes of the present invention include, but are not limited to, catalysts, chain-extenders, cross-linkers, chain-terminators, reaction inhibitors, processing additives, plasticizers, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. In some embodiments, the reaction occurs in the presence of a reaction inhibitor such as benzoyle chloride and/or a plasticizer such as tributyl phosphite. If included, the additive can be included in the isocyanate-reactive resin composition in various amounts. For example, in amounts less than 5, 4, 3, 2, 1, 0.5, 0.1, 0.5, from 0.005 to 0.03, % by weight based on the total weight of the reactants used to form the prepolymer or based on the total weight of the prepolymer.

In many embodiments, the isocyanate prepolymer has a specific gravity of from about 1.05 to 1.10 $g/cm^3$ and is a liquid at 25° C. Further, in many such embodiments, the isocyanate prepolymer has a viscosity of from about 900 to about 1300, alternatively from about 900 to about 1300, cps at 25° C. Further, in many such embodiments, the isocyanate prepolymer has an NCO content of from about 15 to about 40, alternatively from about 20 to about 30, alternatively from about 26 to about 28, % by weight. Determination of NCO contents (% NCO) is accomplished by a standard chemical titration analysis known to those skilled in the art. In various non-limiting embodiments, all values and ranges of values between the aforementioned values are hereby expressly contemplated.

In some embodiments, the isocyanate component includes one or more types of supplemental isocyanates. The supplemental isocyanate may be a polyisocyanate having two or more functional groups, e.g. two or more NCO functional groups. Suitable supplemental isocyanates for purposes of the present disclosure include, but are not limited to, aliphatic and aromatic isocyanates. In various embodiments, the supplemental isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The supplemental isocyanate may be a supplemental isocyanate prepolymer which is different than the aforementioned isocyanate prepolymer. The supplemental isocyanate prepolymer is typically a reaction product of an isocyanate and a polyol and/or a polyamine. The isocyanate used in the supplemental isocyanate prepolymer can be any isocyanate as described above. The polyol used to form the supplemental isocyanate prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific supplemental isocyanates that may be used for purposes of the present disclosure include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-di isopropyl benzene-2,4,6-triisocyanate and 1,3,5-triisopropyl benzene-2,4,6-triisocyanate.

The isocyanate component can comprise one or more additives. The additives may be included in the isocyanate component as part of the isocyanate prepolymer or may be added to the isocyanate prepolymer for a specific purpose. Suitable additives for purposes of the present invention include any additives described herein as well as other additives known in the art.

Isocyanate-Reactive Composition

The polyurethane system of the present invention comprises the isocyanate-reactive resin composition. The isocyanate-reactive composition comprises a second polyether polyol having secondary terminal hydroxyl groups, optionally a third polyether polyol, and an amine-initiated catalytic polyether polyol having primary hydroxyl groups.

Referring now to the second polyether polyol, the second polyether polyol typically has a functionality of greater than about 4, alternatively greater than about 5, alternatively from about 4 to about 8, alternatively from about 5 to about 7, alternatively about 6; a weight average molecular weight of from about 400 to about 2,000, alternatively from about 500 to about 900, alternatively from about 600 to about 800, alternatively from about 650 to about 725, g/mol; a hydroxyl value of from about 30 to about 1,100, alternatively from about 300 to about 900, alternatively from about 400 to about 600, alternatively from about 450 to about 550, mg KOH/g; and a viscosity at 25° C. of from about 15,000 to about 30,000, alternatively from about 20,000 to about 24,000, alternatively from about 21,000 to about 23,000, cps when tested in accordance with ASTM D2196-15. In various non-limiting embodiments, all values and ranges of values between the aforementioned values are hereby expressly contemplated.

In some embodiments, the second polyether polyol is initiated with sorbitol. An initiator, also referred to as a starter, functions as a reaction base for compounds, such as alkylene oxides, which are polymerized to form polyols, and also serves to anchor polyols during formation. The second polyether polyol of these embodiments can comprise EO, PO, and/or BO groups and has various percentages of PO capping. The second polyether polyol has greater than about 90, alternatively greater than about 95, alternatively greater than about 99, alternatively about 100, % PO capping. More specifically, by "about" 100% PO capping, it is meant that all intended capping of the second polyether polyol is PO capping, with any non-PO capping resulting from trace amounts of other alkylene oxides or other impurities. As such, the capping is typically about 100% PO capping, but may be slightly lower, such as at least about 99% PO capping, depending on process variables and the presence of impurities during the production of the second polyether polyol.

The about 100% PO capping provides substantially (about 100%) all secondary hydroxyl groups, which typically react slower than primary hydroxyl groups and produces a more controlled exotherm. In other words, the second polyether polyol having about 100% PO end capping also typically reacts slower than a polyol having EO end capping, as a PO capped polyol is sterically hindered and an EO capped polyol is not sterically hindered.

In one embodiment, the second polyether polyol is a sorbitol initiated polyether polyol with PO capping which has: a functionality of about 6; a weight average molecular weight of about 687 g/mol, and a hydroxyl number of about 490 mg KOH/g.

In various embodiments, the second polyether polyol is present in the isocyanate-reactive composition in an amount of from about 20 to about 90, alternatively from about 20 to about 70, alternatively from about 20 to about 60, alternatively from about 30 to about 50, alternatively from about 35 to about 45, % by weight based on the total weight of said isocyanate-reactive composition. In various non-limiting embodiments, all values and ranges of values between the aforementioned values are hereby expressly contemplated.

Referring now to the third polyether polyol, if included, the third polyether polyol is different than said second polyether polyol. The third polyether polyol typically has a functionality of greater than about 2, alternatively from about 2 to about 4, alternatively about 3; a weight average molecular weight of from about 300 to about 1,500, alternatively from about 400 to about 1,300, alternatively from about 500 to about 1,100, alternatively from about 600 to about 800, alternatively from about 650 to about 750, g/mol; a hydroxyl value of from about 100 to about 400, alternatively from about 150 to about 300, alternatively from about 200 to about 260, mg KOH/g; and a viscosity at 25° C. of from about 200 to about 1,000, alternatively from about 200 to about 500, alternatively from about 250 to about 300, cps when tested in accordance with ASTM D2196-15. In various non-limiting embodiments, all values and ranges of values between the aforementioned values are hereby expressly contemplated.

In some embodiments, the third polyether polyol is initiated with glycerine. An initiator, also referred to as a starter, functions as a reaction base for compounds, such as alkylene oxides, which are polymerized to form polyols, and also serves to anchor polyols during formation. The third polyether polyol of these embodiments can comprise EO, PO, and/or BO groups and has various percentages of PO capping. The third polyether polyol has greater than about 90, alternatively greater than about 95, alternatively greater than about 99, alternatively about 100, % PO capping. More specifically, by "about" 100% PO capping, it is meant that all intended capping of the third polyether polyol is PO capping, with any non-PO capping resulting from trace amounts of other alkylene oxides or other impurities. As such, the capping is typically about 100% PO capping, but may be slightly lower, such as at least about 99% PO capping, depending on process variables and the presence of impurities during the production of the third polyether polyol.

The about 100% PO capping provides substantially (about 100%) all secondary hydroxyl groups, which typically react slower than primary hydroxyl groups and produces a more controlled exotherm. In other words, the third polyether polyol having about 100% PO end capping also typically reacts slower than a polyol having EO end capping, as a PO polyol is sterically hindered and an EO capped polyol is not sterically hindered.

In one embodiment, the third polyether polyol is a glycerine initiated polyether polyol with PO capping which has: a functionality of about 3; a weight average molecular weight of about 700 g/mol, and a hydroxyl number of from about 222 to about 237 mg KOH/g.

In various embodiments, the third polyether polyol is present in the isocyanate-reactive composition in an amount of from about 20 to about 70, alternatively from about 20 to about 60, alternatively from about 30 to about 50, alternatively from about 35 to about 45, % by weight based on the total weight of said isocyanate-reactive composition. In various non-limiting embodiments, all values and ranges of values between the aforementioned values are hereby expressly contemplated.

Referring now to the amine-initiated catalytic polyether polyol, the amine-initiated catalytic polyether polyol typically has a functionality of greater than about 3, alternatively from about 2 to about 6, alternatively from about 3 to about 5, alternatively about 4; a weight average molecular weight of from about 200 to about 1,500, alternatively from about 200 to about 1,000, alternatively from about 200 to about 500, alternatively from about 250 to about 450, alternatively from about 300 to about 400, g/mol; a hydroxyl value of from about 100 to about 1,000, alternatively from about 300 to about 700, alternatively from about 400 to about 500, alternatively from about 450 to about 550, mg KOH/g; and a viscosity at 25° C. of from about 200 to about 1,000, alternatively from about 200 to about 500, alternatively from about 250 to about 350, cps when tested in accordance with ASTM D2196-15. In various non-limiting embodiments, all values and ranges of values between the aforementioned values are hereby expressly contemplated.

In some embodiments, the amine-initiated catalytic polyether polyol is initiated with monoethanolamine. An initiator, also referred to as a starter, functions as a reaction base for compounds, such as alkylene oxides, which are polymerized to form polyols, and also serves to anchor polyols during formation. As set forth above, the catalytic polyol is derived from an amine-based initiator. The catalytic polyol is referred to as a "catalytic" polyol because the catalytic polyol can be used instead of a catalyst to facilitate the chemical reaction of the isocyanate with the polyol component. Said differently, a polyol component that includes the catalytic polyol will typically chemically react with the isocyanate at lower temperatures in the presence of less catalyst (even no catalyst) than a polyol component that does not include the catalytic polyol. Without being bound or limited by any particular theory, it is believed that amine content of the catalytic polyol facilitates the reaction of the isocyanate with the polyol component.

The amine-initiated catalytic polyether polyol of these embodiments can comprise EO, PO, and/or BO groups and has various percentages of EO capping. The amine-initiated catalytic polyether polyol has greater than about 90, alternatively greater than about 95, alternatively greater than about 99, alternatively about 100, % EO capping. More specifically, by "about" 100% EO capping, it is meant that all intended capping of the amine-initiated catalytic polyether polyol is EO capping, with any non-EO capping resulting from trace amounts of other alkylene oxides or other impurities. As such, the capping is typically about 100% EO capping, but may be slightly lower, such as at least about 99% EO capping, depending on process variables and the presence of impurities during the production of the amine-initiated catalytic polyether polyol.

The about 100% EO capping provides substantially (about 100%) all primary hydroxyl groups, which typically react faster than secondary hydroxyl groups and produces to enhance the catalytic effect. In other words, the amine-initiated catalytic polyether polyol having about 100% EO end capping typically reacts faster than the second and third polyether polyols which have PO end capping, as a PO-capped polyol is sterically hindered.

In one embodiment, the amine-initiated catalytic polyether polyol is a polyether polyol with EO capping which has: a functionality of about 4; a weight average molecular weight of about 334 g/mol, and a hydroxyl number of from about 500 mg KOH/g.

In various embodiments, the amine-initiated catalytic polyether polyol is present in the isocyanate-reactive composition in an amount of less than about 10, less than about 8, from about 1 to about 10, alternatively from about 2 to about 8, alternatively from about 3 to about 7, alternatively from about 4 to about 6, % by weight based on the total weight of said isocyanate-reactive composition. In various non-limiting embodiments, all values and ranges of values between the aforementioned values are hereby expressly contemplated.

The isocyanate-reactive resin composition may optionally include one or more of a supplemental polyol which is different than the second polyether polyol, the third polyether polyol, and the amine-initiated catalytic polyol. The supplemental polyol includes one or more OH functional groups, typically at least two OH functional groups. Typically, the supplemental polyol is selected from the group of polyether polyols, polyester polyols, polyether/ester polyols, and combinations thereof; however, other polyols may also be employed. The supplemental polyol can be included in the isocyanate-reactive resin composition in various amounts.

The isocyanate-reactive resin composition typically includes a catalyst. The isocyanate-reactive resin composition may include one or more suitable catalysts selected from those known in the art. The catalyst is typically present in the isocyanate-reactive resin composition to catalyze the exothermic reaction between the isocyanate-reactive resin composition and the isocyanate. It is to be appreciated that the catalyst is typically not consumed in the exothermic reaction between the isocyanate-reactive resin composition and the isocyanate. That is, the catalyst typically participates in, but is not consumed in, the exothermic reaction. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. In some embodiments, the isocyanate-reactive resin composition comprises one or more amine catalysts, e.g. N, N-dimethylcyclohexylamine (DMCHA). If included, the catalyst can be included in various amounts.

The isocyanate-reactive resin composition typically includes a foam stabilizer. The isocyanate-reactive resin composition may include one or more suitable foam stabilizers selected from those known in the art. Non-limiting examples of suitable foam stabilizers include siloxaneoxyalkylene copolymers and other organopolysiloxanes, oxyethylated alkyl-phenols, oxyethylated fatty alcohols, paraffin oils, castor oil esters, ricinoleic acid esters, turkey red oil and groundnut oil. In one embodiment, the foam stabilizer is a hydrolysis-resistant polyethersiloxane co-polymer. If included, the foam stabilizer may be included in the isocyanate-reactive resin composition in various amounts.

The isocyanate-reactive resin composition may optionally include a surfactant. The isocyanate-reactive resin composition may include one or more suitable surfactants selected from those known in the art. The surfactant typically supports homogenization of the blowing agent and the polyol and regulates a cell structure of the polyurethane foam. Non-limiting examples of suitable surfactants include various silicone surfactants, salts of sulfonic acids, e.g. alkali metal and/or ammonium salts of oleic acid, stearic acid, dodecylbenzene- or dinaphthylmethane- disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. If included, the surfactant may be included in the isocyanate-reactive resin composition in various amounts.

The isocyanate-reactive resin composition may optionally include a UV package (e.g. UV component comprising one or more UV components such as UV components selected from ultra violet absorbers; hindered amine light stabilizers, optical brighteners, and combinations thereof.

In many embodiments, the UV package comprises one or more of an amine, i.e., a single type of amine or more than one type of amine. The amine can include one or more amine groups. That is, the amine can be a mono, di, tri, etc. amine. The amine can include a tertiary amine group, a secondary amine group, a primary amine group, or combinations thereof. The amine can include any combination of tertiary, primary, and secondary amines. For example, the amine can include 2 tertiary amine groups. In many embodiments, the amine comprises 1 or more —COOC— groups, 1 or more piperdinyl groups, and/or 1 or more sebacate groups. In various embodiments, the amine is hydroxy functional, i.e., includes 1 ore more hydroxyl groups. The one ore more amines of the UV package are different than the amine initiated polyols and additives described above.

In various embodiments, the amine has weight average molecular weight ($M_w$) of from about 100 to about 2,000, alternatively from about 100 to about 1,500, alternatively from about 100 to about 1,000, alternatively from about 100 to about 900, alternatively from about 100 to about 700, alternatively from about 100 to about 600, alternatively from about 100 to about 500, alternatively from about 100 to about 400, alternatively from about 200 to about 300, g/mol.

In one particular embodiment, the UV package includes (1) at least 1 piperdinyl functional multiple diamine and at least one first amines, som which For example, in one such embodiment, the UV package includes:

(1) a first liquid hindered amine light stabilizer component comprising a mixture of bis(1,2,2,6,6,-pentamethyl-4-piperdinyl)-sebacate and 1-(methyl)-pentamethyl-4-piperdinyl)-sebacate typically dispersed in water;

(2) a second liquid hindered amine light stabilizer (hydroxyphenyl-triazine (HPT) UV absorber) comprising a mixture of 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine dispersed in 1-methoxy-2-propanol; and (3) an optical brightener comprising a mixture of N-(4-Ethoxycarbonylphenyl)-N-Phenyl formamidine and has an OH content of from about 13 to about 15 mg/KOH/g and a viscosity at 25° C. of from about 700 to about 1,500 cps when tested in accordance with ASTM D2196-15.

In various embodiments, the one ore more amines of the UV package are present in the isocyanate-reactive composition in an amount of less than about 10, less than about 8, from about 0.1 to about 6, alternatively from about 0.2 to about 8, alternatively from about 0.3 to about 7, alternatively from about 0.4 to about 6, % by weight based on the total weight of said isocyanate-reactive composition. In various non-limiting embodiments, all values and ranges of values between the aforementioned values are hereby expressly contemplated. For example, the one or more amines can be present in the isocyanate-reactive composition in amounts of from any of the following lower range values: 0.1, 0.2, 0.3, 0.4, 0.5, 0.6, 0.7, 0.8, 0.9, 1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 to any of the following upper range values: 1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.7, 6.9, 7, 7.1, 7.2, 7.3, 7.4, 7.5, 7.6, 7.7, 7.8, 7.9, or 8, % by weight based on the total weight of said isocyanate-reactive composition. Of course, it is to be appreciated that more than one amine may be included in the lubricant composition, in which case the total amount of all the amine included is within the above ranges.

The isocyanate-reactive resin composition may optionally include one or more additives. The additive may include any suitable additive or mixtures of additives known in the art. Suitable additives for purposes of the present invention include, but are not limited to, chain-extenders, cross-linkers, chain-terminators, processing additives, adhesion promoters, anti-oxidants, defoamers, anti-foaming agents, water scavengers, molecular sieves, flame retardants, fumed silicas, fillers, thixotropic agents, silicones, colorants, inert diluents, and combinations thereof. If included, the additive can be included in the isocyanate-reactive resin composition in various amounts.

The isocyanate component and the isocyanate-reactive composition are reacted in the presence of a blowing agent to form the polyurethane foam article. As is known in the art, during the exothermic reaction of the isocyanate-reactive resin composition and the isocyanate, the blowing agent promotes the release of a blowing gas which forms voids, or cells, in the polyurethane foam article. The blowing agent may be a physical blowing agent, a chemical blowing agent, or a combination of a physical blowing agent and a chemical blowing agent. The blowing agent can be included in the isocyanate-reactive composition.

The terminology physical blowing agent describes blowing agents that do not chemically react with the isocyanate and/or the isocyanate-reactive component. The physical blowing agent can be a gas or liquid. The liquid physical blowing agent typically evaporates into a gas when heated, and typically returns to a liquid when cooled. Non-limiting examples of physical blowing agents include hydrofluorocarbons (HFCs), hydrocarbons, and combinations thereof.

The terminology chemical blowing agent describes blowing agents which chemically react with the isocyanate or with other components to release a gas for foaming. Two specific, non-limiting examples of chemical blowing agents are water and formic acid. In various embodiments, the blowing agent includes formic acid, water, and combinations thereof.

As is set forth above, the polyurethane foam article comprises the reaction product of the isocyanate component and the isocyanate-reactive composition. Typically, the isocyanate-reactive resin composition and the isocyanate are combined at an isocyanate index of from about 75 to about 140, alternatively from about 90 to about 140, alternatively from about 90 to about 130, alternatively from about 90 to about 130, alternatively from about 100 to about 130, alternatively from about 110 to about 130, alternatively from about 115 to about 125.

In many embodiments, the polyurethane foam article is a surfboard blank, i.e., is used to form a surfboard. The polyurethane system herein produces a polyurethane foam article which has excellent strength, color, and color stability. Without being bound by theory, it is believed that the specific polyol reacted to make the isocyanate prepolymer and the formation of the prepolymer reduces the exotherm produced when the isocyanate component and the isocyanate-reactive component react to form the surfboard blank. Further, the particular combination of slow and "slow" secondary terminated polyols with a "catalytic" polyol included in the isocyanate-reactive composition react to produce surfboard blanks having excellent strength, uniform cell structure, and a white appearance with excellent UV stability. That is, the exotherm is controlled by first producing an isocyanate prepolymer, and then further controlled by reacting the isocyanate with a particular combination of "slow" polyols and "catalytic" polyols to provide unexpected excellent results.

Further, the polyurethane system forms a surfboard blank which casts and polishes well. Furthermore, surfboards formed from the surfboard blanks of the present invention perform better than surfboards formed from conventional foam blanks comprising toluene diisocyanate based foams or styrenic foams.

In one embodiment, a composite article including the polyurethane foam article as a core/surfboard blank and a laminate composition comprising epoxy resin and fiberglass disposed on the polyurethane foam article is also disclosed herein. In another embodiment, the surfboard blank is coated with a laminate composition comprising polyester resin (as opposed to the laminate composition comprising epoxy resin and fiberglass) to form the laminate. In various embodiments, because the polyurethane foam article/surfboard blank has uniform cell structure and excellent strength, only a single coating or layer of the laminate composition is required.

A Method of Making the Polyurethane Foam Article

The subject invention also provides a method of making the polyurethane foam article comprising the steps of reacting the first polyether polyol and methylene diphenyl diisocyanate to form the isocyanate prepolymer, and reacting the isocyanate prepolymer with the isocyanate-reactive composition in the presence of the blowing agent to form the polyurethane foam article. The isocyanate component, isocyanate prepolymer, and isocyanate-reactive composition are just as described previously.

The unreacted isocyanate-reactive resin composition, the isocyanate component, and the blowing agent are collectively referred to as the polyurethane system. The method includes the steps of providing the isocyanate-reactive resin composition, the isocyanate component, and the blowing agent. In other words, the isocyanate-reactive resin composition, the isocyanate component, and the blowing agent can be supplied for use in the method. The blowing agent can be provided with the isocyanate-reactive resin composition or provided separately. Typically, the isocyanate-reactive resin composition and the isocyanate component are formulated off-site and delivered to an area where they are used. Typically, the polyurethane system, including the isocyanate-reactive resin composition and the isocyanate are supplied together.

The isocyanate-reactive resin composition and the isocyanate may be combined (reacted) by any mechanism known in the art to form the reaction mixture. Typically, the step of combining occurs in a mixing apparatus such as a static mixer, impingement mixing chamber, or a mixing pump. The isocyanate-reactive resin composition and the isocyanate may also be combined in a spray nozzle.

In a typical embodiment, the step of reacting the isocyanate prepolymer with the isocyanate-reactive composition is further defined as molding a reaction mixture comprising the isocyanate prepolymer and the isocyanate-reactive composition. For example, the reaction mixture can be molded into the shape of a surfboard, i.e. into a surfboard blank. In such embodiments, the step of molding can be conducted at a pressure of about 100 psi to about 2,000, alternatively about 200 to about 2,000, alternatively about 1,000 psi to about 2,000, alternatively about 1,250 to about 1,750, psi and/or temperatures of from about 25 to about 95° C. In various non-limiting embodiments, all values and ranges of values between the aforementioned values are hereby expressly contemplated. For example, the step of molding can be conducted at pressures from any of the following lower range values: 50, 100, 150, 200, 300, 400, 500, 600, 700, 800, 900, 1,000, 1,100, 1,200, 1,300, 1,400, or 1,500 to any of the following upper range values: 200, 300, 400, 500, 600, 700, 800, 900, 1,000, 1,100, 1,200, 1,300, 1,400, 1,500, 1,600, 1,700, 1,800, 1,900, or 2,000, psi. For example, the step of molding can be conducted at temperatures from any of the following lower range values: 25, 30, 35, 40, 45, 50, 55, 60, 65, 70, 75, 80, 85, 90 to any of the following upper range values: 30, 35, 40, 45, 50, 55, 60, 65, 70, 75, 80, 85, 90, or 95, ° C.

In some embodiments of the method, the polyurethane foam article is cured (in the mold or outside of the mold) at temperatures from any of the following lower range values 35, 40, 45, 50, 55, 60, 65, 70, 75, 80, 85, 90 to any of the following upper range values 40, 45, 50, 55, 60, 65, 70, 75, 80, 85, 90, or 95, ° C., for times from any of the following lower range values 1, 2, 3, 4, 5, 6, 7, 8, 9, 10, 15, 20, 30, 40, 50, 60, to any of the following upper range values: 3, 4, 5, 6, 7, 8, 9, 10, 15, 20, 30, 40, 50, 60, 70, 80, 90, 100, 110, minutes.

In various non-limiting embodiments, all values and ranges of values between the aforementioned values are hereby expressly contemplated.

In some embodiments of the method, the isocyanate-reactive resin composition and the isocyanate are heated to a temperature of from about 30° C. to about 55° C. prior to the step of reacting/molding. In the method, the isocyanate-reactive resin composition and the isocyanate component or isocyanate prepolymer are reacted at an isocyanate index as set forth above, e.g. at an isocyanate index of from about 90 to about 120.

The method may include the step of applying a laminate composition onto an exterior surface polyurethane foam article (e.g. surfboard blank) to form the laminate. In some embodiments, the laminate composition of the method comprises polyester resin. In other embodiments, the laminate composition of the method comprises epoxy resin and fiberglass. Further, the method can include the step of heating the polyurethane foam article having the laminate composition thereon to cure the laminate composition and form a laminate. For example, the polyurethane foam article having the laminate composition disposed thereon to a temperature of from 35 to 85° C. for up to 8 hours. In various non-limiting embodiments, all values and ranges of values between the aforementioned values are hereby expressly contemplated.

The following examples are intended to illustrate the present invention and are not to be viewed in any way as limiting to the scope of the present invention.

EXAMPLE

Example 1 is described herein. The isocyanate component of Example 1 consists essentially of the isocyanate prepolymer. The isocyanate prepolymer is described in Table 1, with amounts in % by weight based on the total weight of the components used to form the isocyanate prepolymer or based on the total weight of the isocyanate prepolymer. The components in Table 1 are combined or reacted to form the isocyanate prepolymer.

TABLE 1

Formation of the Isocyanate Prepolymer

| Ingredient | Weight % |
| --- | --- |
| Isocyanate | 80-98 |
| First Polyether Polyol | 2-20 |
| Total | 100.00 |

Isocyanate is the methylene diphenyl diisocyanate comprising trace amounts (e.g. less than 0.5% by weight) of 2,2'-isomer, about 50% by weight of 2,4'-isomer, and about 50% by weight of 4,4'-isomer.

First polyether polyol is a pentaerythritol initiated polyether polyol with PO capping which has: a functionality of about 4; a weight average molecular weight of about 400 g/mol, and a hydroxyl number of about 555 mg KOH/g.

The isocyanate system of Example 1 is described in Table 2, with amounts in % by weight based on the total weight of the isocyanate-reactive composition. The components in Table 2 are reacted under pressure in a mold to form the polyurethane foam article having the shape of a surfboard blank.

TABLE 2

The Polyurethane Foam Article

| Ingredient | Weight % |
| --- | --- |
| Second Polyether Polyol | 30-50 |
| Third Polyether Polyol | 30-50 |
| Amine-Initiated Catalytic Polyol | 1-10 |
| Foam Stabilizer | About 2 |
| Catalyst A | <1 |
| Catalyst B | <1 |
| UV Package | 1-8 |
| Blowing Agent A | About 3 |
| Blowing Agent B | About 1.5 |
| Isocyanate Component | |
| Isocyanate Component/Isocyanate Prepolymer as Set Forth in Table 1 | Isocyanate Index: 118 |

Second Polyether Polyol is a sorbitol initiated polyether polyol with PO capping which has: a functionality of about 6; a weight average molecular weight of about 687 g/mol, and a hydroxyl number of about 490 mg KOH/g.

Third Polyether Polyol is a glycerine initiated polyether polyol with PO capping which has: a functionality of about 3; a weight average molecular weight of about 700 g/mol, and a hydroxyl number of from about 222 to about 237 mg KOH/g.

Amine-Initiated Catalytic Polyol is a polyether polyol with EO capping which has: a functionality of about 4; a weight average molecular weight of about 334 g/mol, and a hydroxyl number of from about 500 mg KOH/g.

Foam Stabilizer is a hydrolysis-resistant polyethersiloxane co-polymer.

Catalysts A and B are amine catalysts.

UV Package comprises bis(1,2,2,6,6,-pentamethyl-4-piperdinyl)-sebacate and 1-(methyl)-8-(1,2,2,6,6- pentamethyl-4-piperdinyl)-sebacate, 2-[4-[(2-Hydroxy-3-dodecyloxypropyl)oxy]-2-hydroxyphenyl]-4,6-bis(2,4-dimethylphenyl)-1,3,5-triazine, 2-[4-[(2-Hydroxy-3-tridecyloxypropyl)oxy]-2-hydroxyphenyl]-4,6-bis(2,4-dimethylphenyl)-1,3,5-triazine, and N-(4-Ethoxycarbonylphenyl)-N-Phenyl formamidine.

Blowing Agent A is water.

Blowing Agent B is formic acid.

Advantageously, the polyurethane foam article of the subject invention improves upon the prior art. That is, the polyurethane system of Example 1 produces a polyurethane foam article which has excellent strength, color, and color stability when used as/in a surfboard blank. The particular combination of slow and "slow" secondary terminated polyols with a "catalytic" polyol included in the isocyanate-reactive composition react to produce surfboard blanks having excellent strength, uniform cell structure, and a white appearance with excellent UV stability. That is, the polyurethane exotherm is controlled by first producing an isocyanate prepolymer, and then further controlled by reacting the isocyanate with a particular combination of "slow" polyols and "catalytic" polyols to provide unexpected excellent results.

Further, the polyurethane system of Example 1 forms a surfboard blank which casts and polishes well. Furthermore, surfboards formed from the surfboard blanks of the present invention perform better than surfboards formed from conventional foam blanks comprising toluene diisocyanate based foams or styrenic foams.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A polyurethane foam article comprising the reaction product of:
   (A) an isocyanate component comprising an isocyanate prepolymer, said isocyanate prepolymer comprising the reaction product of:
      a first polyether polyol; and
      (ii) a methylene diphenyl diisocyanate; and
   (B) an isocyanate-reactive composition comprising:
      a second polyether polyol having secondary terminal hydroxyl groups; and
      (ii) an amine-initiated catalytic polyether polyol having primary hydroxyl groups;
   in the presence of a blowing agent,
   wherein the polyurethane foam article has a density of from about 16 to about 80 kg/m$^3$.

2. A polyurethane foam article as set forth in claim 1 wherein said first polyether polyol has a weight-average molecular weight of from about 200 to about 900 g/mol.

3. A polyurethane foam article as set forth in claim 1 wherein said first polyether polyol has a hydroxyl functionality of from about 2 to about 5.

4. A polyurethane foam article as set forth in claim 1 wherein said first polyether polyol comprises greater than about 99% propyleneoxy end caps based on a total number of end caps present in said first polyether polyol.

5. A polyurethane foam article as set forth in claim 1 wherein said methylene diphenyl diisocyanate comprises:
   greater than about 40% by weight of 2,4'-isomer based on the total weight of the methylene diphenyl diisocyanate;
   greater than about 40% by weight of 4,4'-isomer based on the total weight of the methylene diphenyl diisocyanate; and
   less than about 10% by weight of 2,2'-isomer based on the total weight of the methylene diphenyl diisocyanate.

6. A polyurethane foam article as set forth in claim 1 wherein said first polyether polyol is present in said isocyanate prepolymer in an amount of from about 2 to about 20% by weight based on the total weight of said isocyanate prepolymer, and said methylene diphenyl diisocyanate is present in said isocyanate prepolymer in an amount of from about 80 to about 98% by weight based on the total weight of said isocyanate prepolymer.

7. A polyurethane foam article as set forth in claim 1 wherein said isocyanate prepolymer has an NCO content of from about 15 to about 40% by weight based on the total weight of said isocyanate prepolymer.

8. A polyurethane foam article as set forth in claim 1 wherein said second polyether polyol has a weight-average molecular weight of from about 400 to about 2,000 g/mol and/or a hydroxyl functionality of from about 4 to about 8.

9. A polyurethane foam article as set forth in claim 1 wherein said second polyether polyol is present in said isocyanate-reactive composition in an amount of from about 20 to about 90% by weight based on the total weight of said isocyanate-reactive composition.

10. A polyurethane foam article as set forth in claim 1 wherein said isocyanate-reactive composition further comprises a third polyether polyol having secondary terminal hydroxyl groups which is different than said second polyether polyol.

11. A polyurethane foam article as set forth in claim 10 wherein said third polyether polyol has a weight-average molecular weight of from about 300 to about 1,500 g/mol and/or a hydroxyl functionality of from about 2 to about 4.

12. A polyurethane foam article as set forth in claim 10 wherein said third polyether polyol is present in said isocyanate-reactive composition in an amount of from about 20 to about 60% by weight based on the total weight of said isocyanate-reactive composition.

13. A polyurethane foam article as set forth in claim 1 wherein said amine-initiated catalytic polyether polyol has a weight-average molecular weight of from about 200 to about 1,500 g/mol and/or a hydroxyl functionality of from about 2 to about 6.

14. A polyurethane foam article as set forth in claim 1 wherein said amine-initiated catalytic polyether polyol is present in said isocyanate-reactive composition in an amount of less than about 10% by weight based on the total weight of said isocyanate-reactive composition.

15. A polyurethane foam article as set forth in claim 1 wherein said isocyanate-reactive composition further comprises an optical brightener comprising a first amine which is hydroxy-functional.

16. A polyurethane foam article as set forth in claim 15 wherein said first amine is a diamine.

17. A polyurethane foam article as set forth in claim 1 wherein said isocyanate-reactive composition further comprises a UV stabilizer comprising a second amine comprising piperdine.

18. A polyurethane foam article as set forth in claim 1 having a density of from about 40 to about 60 kg/m$^3$.

* * * * *